United States Patent
Luo et al.

(10) Patent No.: US 11,378,987 B2
(45) Date of Patent: Jul. 5, 2022

(54) METHOD AND SYSTEM FOR PATROLLING AN EXPRESSWAY BY UNMANNED AERIAL VEHICLES

(71) Applicant: Hefei University of Technology, Anhui (CN)

(72) Inventors: He Luo, Anhui (CN); Peng Zhang, Anhui (CN); Guoqiang Wang, Anhui (CN); Moning Zhu, Anhui (CN); Xiaoxuan Hu, Anhui (CN); Ju Wang, Anhui (CN); Xiaoduo Li, Anhui (CN); Wei Xia, Anhui (CN); Peng Jin, Anhui (CN); Huawei Ma, Anhui (CN)

(73) Assignee: Hefei University of Technology, Anhui (CN)

(*) Notice: Subject to any disclaimer, the term of this patent is extended or adjusted under 35 U.S.C. 154(b) by 260 days.

(21) Appl. No.: 16/688,433

(22) Filed: Nov. 19, 2019

(65) Prior Publication Data
US 2020/0209892 A1 Jul. 2, 2020

(30) Foreign Application Priority Data
Dec. 26, 2018 (CN) .......................... 201811602408.0

(51) Int. Cl.
*G05D 1/10* (2006.01)
*B64C 39/02* (2006.01)
(Continued)

(52) U.S. Cl.
CPC .......... *G05D 1/104* (2013.01); *B64C 39/024* (2013.01); *B64F 1/362* (2013.01); *G01S 19/41* (2013.01);
(Continued)

(58) Field of Classification Search
CPC .... G05D 1/104; G05D 1/0027; B64C 39/024; B64C 2201/12; B64F 1/362; G01S 19/41; G08G 1/012; G08G 1/0129
See application file for complete search history.

(56) References Cited

U.S. PATENT DOCUMENTS

2017/0187993 A1* 6/2017 Martch ............ G08B 13/19684
2018/0068165 A1* 3/2018 Cantrell ............... G06V 20/188
(Continued)

FOREIGN PATENT DOCUMENTS

| CN | 107067489 A | 8/2017 |
| CN | 108829111 A | 11/2018 |

(Continued)

*Primary Examiner* — Aniss Chad
*Assistant Examiner* — Stephanie T Su
(74) *Attorney, Agent, or Firm* — Duane Morris LLP (57) ABSTRACT

The embodiments of the present disclosure provide a method and system for patrolling an expressway by unmanned aerial vehicles (UAVs). The method is applied to the system including a control center, a plurality of UAVs and a plurality of advertising board charging base stations. The method firstly receives unmanned aerial vehicle (UAV) status information sent by the plurality of unmanned aerial vehicles and road section patrolling data through the control center, and receives advertising board charging base station information sent by the plurality of advertising board charging base stations, then classifies, stores and analyzes the received data and information, and finally generates and sends control commands for the UAVs and charging advertising boards. On one hand, the technical solutions of the present disclosure may comprehensively schedule an UAV formation, may also comprehensively control the advertising board charging base stations, and may further dispose and schedule task responses; and on the other hand, the technical solutions of the present disclosure may analyze situations of accidents, violations and the like and schedul- (Continued)

ing and usage of the UAVs and the advertising board charging base stations, thereby providing decision support data for the control center.

8 Claims, 5 Drawing Sheets

(51) Int. Cl.
*G01S 19/41* (2010.01)
*G05D 1/00* (2006.01)
*G08G 1/01* (2006.01)
*B64F 1/36* (2017.01)

(52) U.S. Cl.
CPC .......... *G05D 1/0027* (2013.01); *G08G 1/012* (2013.01); *G08G 1/0129* (2013.01); *B64C 2201/12* (2013.01)

(56) References Cited

U.S. PATENT DOCUMENTS

| | | | |
|---|---|---|---|
| 2020/0043350 A1* | 2/2020 | Cantrell | B64C 39/024 |
| 2020/0089220 A1* | 3/2020 | Schmalzried | G05D 1/104 |
| 2021/0248647 A1* | 8/2021 | Maliszewski | H04N 9/3147 |

FOREIGN PATENT DOCUMENTS

| | | |
|---|---|---|
| CN | 109697565 A | 4/2019 |
| EP | 2963519 A1 | 1/2016 |

* cited by examiner

METHOD AND SYSTEM FOR PATROLLING AN EXPRESSWAY BY UNMANNED AERIAL VEHICLES

CROSS REFERENCE TO RELATED APPLICATIONS

This application claims priority to Chinese Application No. 201811602408.0, filed on Dec. 26, 2018, entitled "Method and System for Patrolling an Expressway by Unmanned Aerial Vehicles," which is specifically and entirely incorporated by reference.

FIELD OF THE DISCLOSURE

The present disclosure relates to the technical field of unmanned aerial vehicles (UAVs), and more particularly relates to a method and system for patrolling an expressway by UAVs.

BACKGROUND OF THE DISCLOSURE

With the increasing development of the technical field of UAVs, use of the UAVs to patrol and survey expressways has become a tendency. At present, in the expressway patrolling process, due to the limitation of the duration capability and autonomous patrolling capability, a fixed road section is mostly patrolled by a local artificial remote control mode, that is, the UAVs are released and recovered at the same place or equipment vehicle. During long-range patrolling for the expressways, the UAVs can only be carried and placed by specialized personnel for patrolling.

SUMMARY OF THE DISCLOSURE

In view of this, the embodiments of the present disclosure provide a method, a control center, UAVs, advertising board charging base stations and a system for patrolling an expressway by UAVs, so as to solve the problem that the unmanned aerial vehicle (UAV) is low in duration capability and autonomous patrolling capability during expressway patrolling in the prior art.

On the first aspect, the embodiment of the present disclosure provides a method for patrolling an expressway by UAVs. The method includes:

receiving UAV status information sent by a plurality of UAVs, classifying the received UAV status information, and performing analysis respectively according to the categories of the UAV status information to obtain status results corresponding to the various UAVs; and generating and sending corresponding control instructions to the various UAVs according to the status results corresponding to the various UAVs.

On a second aspect, the embodiment of the present disclosure provides a method for patrolling an expressway by UAVs. The method includes:

sending status information to a control center such that the control center classifies the received UAV status information and respectively performs analysis according to the categories of the UAV status information to obtain status results corresponding to the various UAVs; and receiving control instructions generated and sent by the control center based on the status results, and executing task commands carried in the control instructions.

On a third aspect, the embodiment of the present disclosure provides a control center, including:

an analysis module, configured to receive UAV status information sent by a plurality of UAVs, classify the received UAV status information, and respectively perform analysis according to the categories of the UAV status information to obtain status results corresponding to the various UAVs; and a processing module, configured to generate and send corresponding control instructions to the various UAVs according to the status results corresponding to the various UAVs.

The aspect as described above and any possible implementation further provide an implementation, and the analysis module is further configured to:

receive road section patrolling data sent by the plurality of UAVs, and analyze the road section patrolling data received in a preset period and recorded road section traffic data to obtains average business volumes corresponding to the various UAVs.

On a fourth aspect, the embodiment of the present disclosure provides an UAV, including:

a reporting module, configured to send status information to a control center such that the control center classifies the received UAV status information and respectively performs analysis according to the categories of the UAV status information to obtain status results corresponding to the various UAVs;

an execution module, configured to receive control instructions generated and sent by the control center based on the status results, and executing task commands carried in the control instructions.

On a fifth aspect, the embodiment of the present disclosure provides an advertising board charging base station, including:

an advertising board body, distributed along the roadside of an expressway;

a charging platform, disposed on the advertising board body, wherein at least one UAV charging pile is arranged on the charging platform, and the charging pile is powered by a power supply carried by the advertising board body; and a communication unit, disposed on the advertising board body and configured to establish a communication connection with the UAV and the control center to send advertising board charging base station information to the UAV and the control center.

On a sixth aspect, the embodiment of the present disclosure provides a system for patrolling an expressway by UAVs, including the control center, the UAVs and the advertising board charging base stations according to any one of the above.

One of the above technical solutions has the following beneficial effects that:

the method for patrolling an expressway by UAVs provided by the embodiment of the present disclosure is applied to the system including the control center, the plurality of UAVs and the plurality of advertising board charging base stations, and the method includes, via the control center, receiving the UAV status information sent by the plurality of UAVs, classifying the received UAV status information and respectively performing analysis according to the categories of the UAV status information to obtain the status results corresponding to the various UAVs, and then generating and sending corresponding control instructions to the various UAVs according to the status results corresponding to the various UAVs, so as to enable the corresponding UAVs to execute the corresponding control instructions. In this way, the corresponding control instructions can be transmitted by analyzing the current states of the UAVs, so as to realize intelligent management and control of taking off, patrolling, landing and charging of the UAVs. For the long-range patrolling of the expressway, the whole system is relatively high in autonomous patrolling capability.

BRIEF DESCRIPTION OF DRAWINGS

In order to illustrate the technical solutions of the embodiments of the present disclosure more clearly, the drawings used in the embodiments will be briefly described below. It is apparent that the drawings in the following descriptions are only some embodiments of the present disclosure. Those of ordinary skill in the art can also obtain other drawings based on these drawings without paying creative work.

DETAILED DESCRIPTION OF THE EMBODIMENTS

To better understand the technical solutions of the present disclosure, the embodiments of the present disclosure are described below in detail in combination with the accompanying drawings.

It should be specified that the embodiments described are only one part of the embodiments of the present disclosure, and not all of the embodiments. All other embodiments obtained by those skilled in the art based on the embodiments of the present disclosure without paying creative work shall all fall within the protection scope of the present disclosure.

The terms used in the embodiments of the present disclosure are for the purpose of describing particular embodiments only and are not intended to limit the present disclosure. The singular forms "a", "an", "said" and "the" used in the embodiments of the present disclosure and the attached claims are also intended to include multiple forms unless the context clearly indicates other meanings.

It should be understood that the term "and/or" as used herein is merely an association relationship describing associated objects, and indicates that there may be three relationships. For example, A and/or B may indicate that A exists alone, A and B exist at the same time, and B exists alone. In addition, the character "/" herein generally indicates that the contextual associated objects are in an "or" relationship.

Depending on the context, the word "if" as used herein may be interpreted as "as" or "when" or "in response to the determination" or "in response to the detection". Similarly, depending on the context, the phrase "if . . . is determined" or "if . . . is detected (conditions or events stated)" may be interpreted as "when . . . is determined" or "in response to the determination" or "when . . . is detected (conditions or events stated)" or "in response to the detection (conditions or events stated)".

The terms "status information" and "state information" described herein are used interchangeably, and the terms "status results" and "state results" described herein are used interchangeably.

Figure 1:
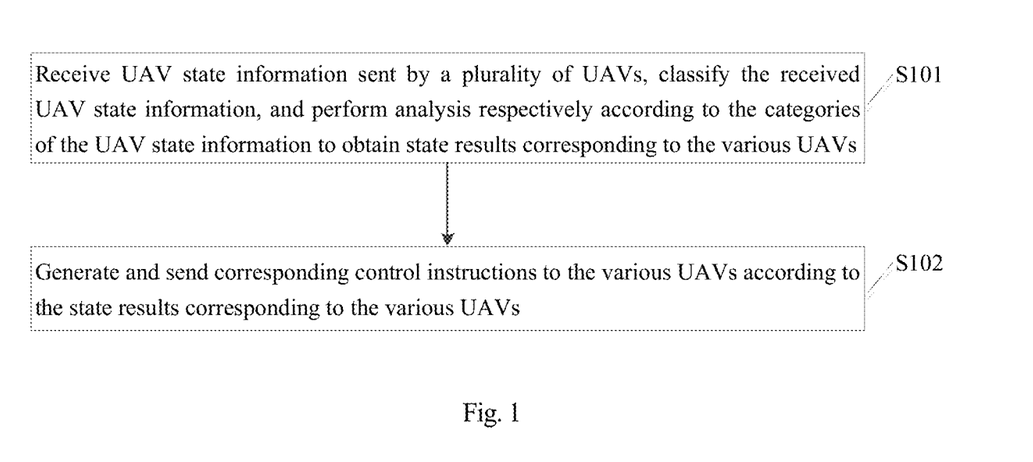
FIG. 1 is a flowchart of a method for patrolling an expressway by UAVs provided by the embodiment of the present disclosure.

On the first aspect, the embodiment of the present disclosure provides a method for patrolling an expressway by UAVs. FIG. 1 is a flowchart of a method for patrolling an expressway by UAVs provided by the embodiment of the present disclosure. Referring to FIG. 1, the method includes that:

S101, UAV status information sent by a plurality of UAVs is received, the received UAV status information is classified, and analysis is performed respectively according to the categories of the UAV status information to obtain status results corresponding to the various UAVs; and S102, corresponding control instructions are generated and sent to the various UAVs according to the status results corresponding to the various UAVs.

The method for patrolling an expressway provided by the embodiment of the present disclosure may issue the corresponding instructions by analyzing the current states of the UAVs, thereby realizing intelligent management and control of taking-off, patrolling, landing and charging of the UAVs. Especially for long-range patrolling of the expressway, the whole system is relatively high in autonomous patrolling capability.

In the specific implementation process, a control center also receives road section patrolling data sent by the plurality of UAVs, and analyzes the road section patrolling data received in a preset period and recorded road section traffic data to obtain average business volumes corresponding to the various UAVs.

For example, there are 2 UAVs patrolling a road section A. The road section A is an accident-prone road section where 30 traffic accidents and 120 violations have occurred in one month, wherein it is assumed that there are 30 days in a month. There are 5 UAVs patrolling a road section B. The road section B is an accident-prone faraway road section where 5 traffic accidents and 20 violations have occurred in one month. The average traffic volume of the UAVs in the road section A is 0.5 traffic accident/day and 2 violations/day. The average traffic volume of the UAVs in the road section B is 0.033 traffic accident/day and 0.133 violation/day. It can be seen that the system sets insufficient UAVs in the road section A and sets excessive UAVs in the road section B, and the control center may feed these results back to a user side for adjustment.

In a specific implementation process, the control center also receives advertising board charging base station information sent by a plurality of advertising board charging base stations and analyzes the advertising board charging base station information received within a preset period to obtain usage rates of charging piles on the various advertising board charging base stations.

For example, if two charging piles are arranged on the advertising board charging base station A, the service time of the two charging piles within one month is totally 1,440 h; and if five charging piles are arranged on the advertising board charging base station A, the service time of the five charging piles within one month is totally 900 h. The usage rate of the charging piles on the advertising board charging base station A is 100 percent, and the usage rate of the charging piles on the advertising board charging base station A is 25 percent. The control center may feed these results to the user side for advertising board location selection and adjustment of the number of the charging piles.

In Step 101, firstly, the UAV status information may be specifically classified, and the categories of the UAV status information include:

a to-take-off state category, which is a category of UAV status information indicating that an UAV is stopped on a designated advertising board charging base station and has a power exceeding a preset threshold value;

a patrolling state category, which is a category of UAV status information indicating that an UAV is executing a patrolling task and does not complete this task;

a to-land state category, which is a category of UAV status information indicating that an UAV has completed the patrolling task and does not land;

a charging state category, which is a category of UAV status information indicating that an UAV is stopped on a designated advertising board charging base station and has a powder not exceeding a preset threshold value; and a prewarning state category, which is a category of UAV status information indicating that an UAV is deviated from a preset flight path points by an amount greater than a preset threshold value or the own power is not enough to allow the UAV to land on a designated advertising board charging base station.

Then, targeted analysis and processing are performed on the classified UAV status information by a data statistical technology and a data analysis technology to obtain the status results. The corresponding control instructions are generated by a preset algorithm according to the analysis results of the various UAVs, and are sent to the corresponding UAVs, thereby realizing control of a patrolling system.

It can be understood that the UAV in the patrolling state is deviated from the preset flight path points by an amount not greater than the preset threshold value and the own power is enough to allow the UAV to land on the designated advertising board charging base station.

Based on the above, analysis may be performed according to the status information of the UAVs. In some embodiments, the status information specifically includes: UAV numbered information, UAV model information, UAV power information, UAV position information and task queue information.

The function of each piece of status information in the specific implementation process is described in detail below.

a) UAV numbered information

The UAV numbered information is the unique identification of each UAV in a formation. The current UAV may be distinguished from other UAVs in the formation by identifying the UAV numbered information. The UAV numbered information plays an important role in storage and classification of data uploaded by the UAV and determination of an object to which the control instruction is issued.

b) UAV model information

Since different UAV models may possibly need to be matched with different types of charging piles, obtaining of the UAV model information may determine the type of a charging pile corresponding to this UAV.

c) UAV power information

When an UAV is in a charging state, obtaining of the UAV power information may be used as one of parameters for determining whether the UAV in patrolling needs to land for charging; and when the UAV is in the charging state, obtaining of the UAV power information may be used to determine whether the UAV in charging is fully charged.

d) UAV position information

The UAV position information is also important information for determining the state of an UAV, which may determine the position of the UAV in real time, determine whether the UAV is in a patrolling process or in a charging process, and analyze a relative position relation between the UAV in the current running state and an advertising board charging base station if it is in the patrolling process, and then determine whether the UAV is deviated from a preset flight path, determine a distance from a preset stop point and the like.

e) Task queue information

Obtaining of the task queue information may determine a completion result of an UAV control instruction. For example, if an UAV receives a patrol start instruction, the UAV may upload the task queue information only when patrolling from a preset start point to a preset end point; and if the UAV receives a patrol end instruction, the UAV may upload the task queue information only when landing on a designated advertising board for charging. A new control instruction may be received only after the task queue information is received and the UAV is determined as a new state result.

In some embodiments, the above step S102 may specifically include that:

a patrol start instruction is generated and sent to the first UAV according to the state result corresponding to the first UAV, so as to cause the first UAV to start patrolling according to the preset flight path; and a continue-to-patrol instruction is generated and sent to the second UAV according to the state result corresponding to the second UAV, so as to cause the second UAV to continue the patrolling according to the preset flight path; and a patrol end instruction is generated and sent to the third UAV according to the state result corresponding to the third UAV, so as to cause the third UAV to land on a designated advertising board charging base station and start to be charged; and a continue-to-charge instruction is generated and sent to the fourth UAV according to the state result corresponding to the fourth UAV, so as to cause the fourth UAV to continue to keep the charging state; and an emergency landing instruction is generated and sent to the fifth UAV according to the state result corresponding to the fifth UAV, so as to cause the fifth UAV to land on an advertising board charging base station available for charging and closest to the current fifth UAV and start to be charged.

The UAV status information corresponding to the first UAV, the second UAV, the third UAV, the fourth UAV and the fifth UAV is respectively the to-take-off state category, the patrolling state category, the to-land state category, the charging state category and the prewarning state category.

In this way, the control instructions corresponding to the UAVs may be respectively sent to different UAVs, so that the control instructions received by the UAVs are more suitable for the current states of the UAVs, and the efficiency and autonomy of patrolling are improved.

In some embodiments, the control center receives the plurality of pieces of UAV status information which may be represented by the following set: $\{Sl_1, Sl_2, Sl_3, Sl_4, \ldots, Sl_n\}$, and then classifies the UAV status information to form the to-take-off state category $\{Sl_1, \ldots, Sl_a\}$, the patrolling state category $\{Sl_{a+1}, \ldots, Sl_b\}$, the to-land state category $\{Sl_{b+1}, \ldots, Sl_c\}$, the charging state category $\{Sl_{c+1}, \ldots, Sl_d\}$ and the prewarning state category $\{Sl_{d+1}, \ldots, Sl_n\}$ to obtain the status results of the various UAVs through a preset analysis algorithm. The status results may be represented by the following set: $\{SR_1, SR_2, SR_3, SR_4, \ldots, SR_n\}$. Then a control instruction list $\{CO_1, CO_2, CO_3, CO_4, \ldots, CO_n\}$ of the various UAVs is generated through an UAV scheduling algorithm, and is sent to the corresponding UAVs since part of the UAVs do not need the control instructions.

The method for patrolling an expressway by UAVs of the present disclosure is further described below by examples.

There is a hypothesis that the whole patrolling system patrols two road sections A and B. The patrolling system includes: an UAV formation including 16 UAVs in total; a control center; and eight advertising board charging base stations, each of which is provided with two charging piles. Four advertising board charging base stations are disposed on the road section A, and eight UAVs are arranged to patrol this road section. Four advertising board charging base stations are disposed on the road section B, and eight UAVs are arranged to patrol this road section.

In the patrolling process of the system, all the 16 UAVs report UAV status information (including the UAV numbered information, the UAV model information, the UAV power information, the UAV position information and the task queue information) and road section patrolling data to the control center in real time. Meanwhile, all the eight advertising board charging base stations report advertising board charging base station information (including charging pile idling information, charging model information and correction information) to the control center in real time.

The control center stores the received information in a database, then performs comprehensive analysis to analyze the current states of the UAVs and the advertising board charging base stations, then processes and generates control instructions corresponding to the 16 UAVs, and sends them to the corresponding UAVs, and the UAVs reads the instructions to execute next tasks, such as taking off for patrolling, continuing the patrolling, landing for charging or continuing to be charged, thereby realizing the distribution of patrolling.

If the control center analyzes that a certain UAV is deviated from preset flight path points by an amount greater than a preset threshold value or the own power is not enough for the UAV to land on a designated advertising board charging base station, an emergency landing control command is issued, and the UAV lands on the advertising board charging base station available for charging and closest to the current UAV and starts to be charged. The specific selection of an advertising board charging base station may be analyzed and determined by the control center, and then is issued to a corresponding UAV, thereby realizing emergency disposal of an accident in the patrolling process of the system.

The control center may also perform statistics and analysis on the acquired data to obtain accident and violation quantity information, information of the accident or violation-prone districts, the average business volumes corresponding to the various UAVs and the usage rates of the charging piles on the two road sections A and B. Therefore, the user side may reasonably adjust the number of UAVs and the number of advertising board charging base stations which are disposed on the road sections A and B, may re-adjust the number and models of the charging piles on the advertising board charging base stations, and may also obtain traffic management-based decision support. By obtaining the above information, the UAVs may be deployed and optimized more rationally, decision support may be provided for locations of the various advertising board charging base stations, and the charging piles on the various advertising board charging base stations may also be managed more comprehensively.

If the average business volume of the UAVs and the usage rate of the charging piles in the road section B are significantly greater than those of the road section A via analysis, the deployment of the UAVs and the number of charging piles are adjusted. For example, the advertising board charging base stations of the road section A may be adjusted to three, and six UAVs are arranged to patrol this road section; and the advertising board charging base stations of the road section B is adjusted to five, and ten UAVs are arranged to patrol this road section. If it is not chosen to adjust the number of advertising board charging base stations, the number of charging piles on each advertising board charging base station of the road section B may be adjusted to three.

Figure 2:
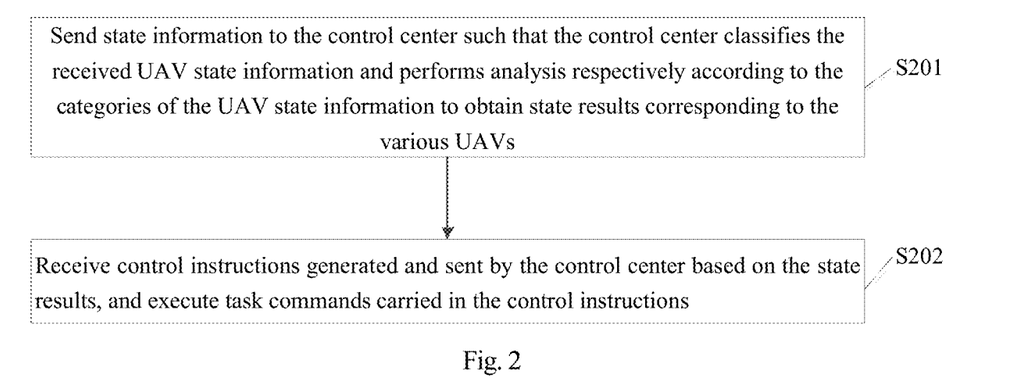
FIG. 2 is another flowchart of a method for patrolling an expressway by UAVs provided by the embodiment of the present disclosure.

On the second aspect, the embodiment of the present disclosure further provides another method for patrolling an expressway by UAVs. FIG. 2 is another flowchart of a method for patrolling an expressway by UAVs provided by the embodiment of the present disclosure. Referring to FIG. 2, the method includes that:

S201, status information is sent to a control center such that the control center classifies the received UAV status information and performs analysis respectively according to the categories of the UAV status information to obtain status results corresponding to various UAVs;

S202, control instructions generated and sent by the control center based on the status results are received, and task commands carried in the control instructions are executed.

According to the method for patrolling an expressway provided by the present disclosure, the UAVs may acquire and upload the UAV status information in real time or within a designated period. The UAV status information is analyzed and calculated by the control center, so as to obtain the status results corresponding to the UAVs, and then the control center generates the control instructions according to the status results, and sends them to the corresponding UAVs. The UAVs execute the task commands carried in the control instructions.

During specific implementation, the UAVs also send road section patrolling data to the control center, so that the control center analyzes the road section patrolling data received within a preset period and recorded road section traffic data to obtain average business volumes corresponding to the various UAVs.

In some embodiments, the UAV status information may specifically include: UAV numbered information, UAV model information, UAV power information, UAV position information and task queue information.

It should be noted that the categories of the UAV status information include:

a to-take-off state category, which is a category of UAV status information indicating that an UAV is stopped on a designated advertising board charging base station and has a power exceeding a preset threshold value;

a patrolling state category, which is a category of UAV status information indicating that an UAV is executing a patrolling task and does not complete this task;

a to-land state category, which is a category of UAV status information indicating that an UAV has completed the patrolling task and does not land;

a charging state category, which is a category of UAV status information indicating that an UAV is stopped on a designated advertising board charging base station and has a powder not exceeding a preset threshold value; and a prewarning state category, which is a category of UAV status information indicating that an UAV is deviated from preset flight path points by an amount greater than a preset threshold value or the own power is not enough to allow the UAV to land on a designated advertising board charging base station.

In some embodiments, the above step S202 specifically includes that:

a patrol start instruction generated and sent by the control center based on a state result is received, and patrolling is started according to a preset flight path; or a continue-to-patrol instruction generated and sent by the control center based on a state result is received, and the patrolling is continued according to the preset flight path; or a patrol end instruction generated and sent by the control center based on a state result is received, and an UAV lands on a designated advertising board charging base station and starts to be charged; or a continue-to-charge instruction generated and sent by the control center based on a state result is received, and the charging state is continued to be kept; or an emergency landing instruction generated and sent by the control center based on a state result is received, and an UAV lands on an advertising board charging base station available for charging and closest to the current UAV, and starts to be charged.

The UAVs of the to-take-off state category and the charging state category are all stopped on the advertising board charging base stations. The UAVs of the to-take-off state category have been charged completely, and the UAVs of the charging state category are not charged completely. The UAVs of the patrolling state category, the to-land state category and the prewarning state category are all in flying. The UAVs of the patrolling state category do not complete the patrolling task. The UAVs of the to-land state category have completed the patrolling task. The UAVs of the prewarning state category are in abnormal states.

The UAVs in the patrolling state may upload the longitudes and latitudes of designed path points to an UAV control system according to an UAV path planning and autonomous control technology to realize autonomous control. The UAVs in the to-land state may realize precise landing and charging at the charging pile level according to a differential positioning technology. The differential positioning technology is also known as a differential GPS (Global Positioning System) technology, namely a GPS receiver is placed on a reference station for observation. A distance correction between the reference station and a satellite is calculated according to the known precise coordinates of the reference station, and the reference station sends the data out in real time. Receivers of the UAVs also receive the correction information sent by the reference station during the GPS observation, and correct the positioning results of the UAVs, so as to improve the positioning precision.

Figure 3:
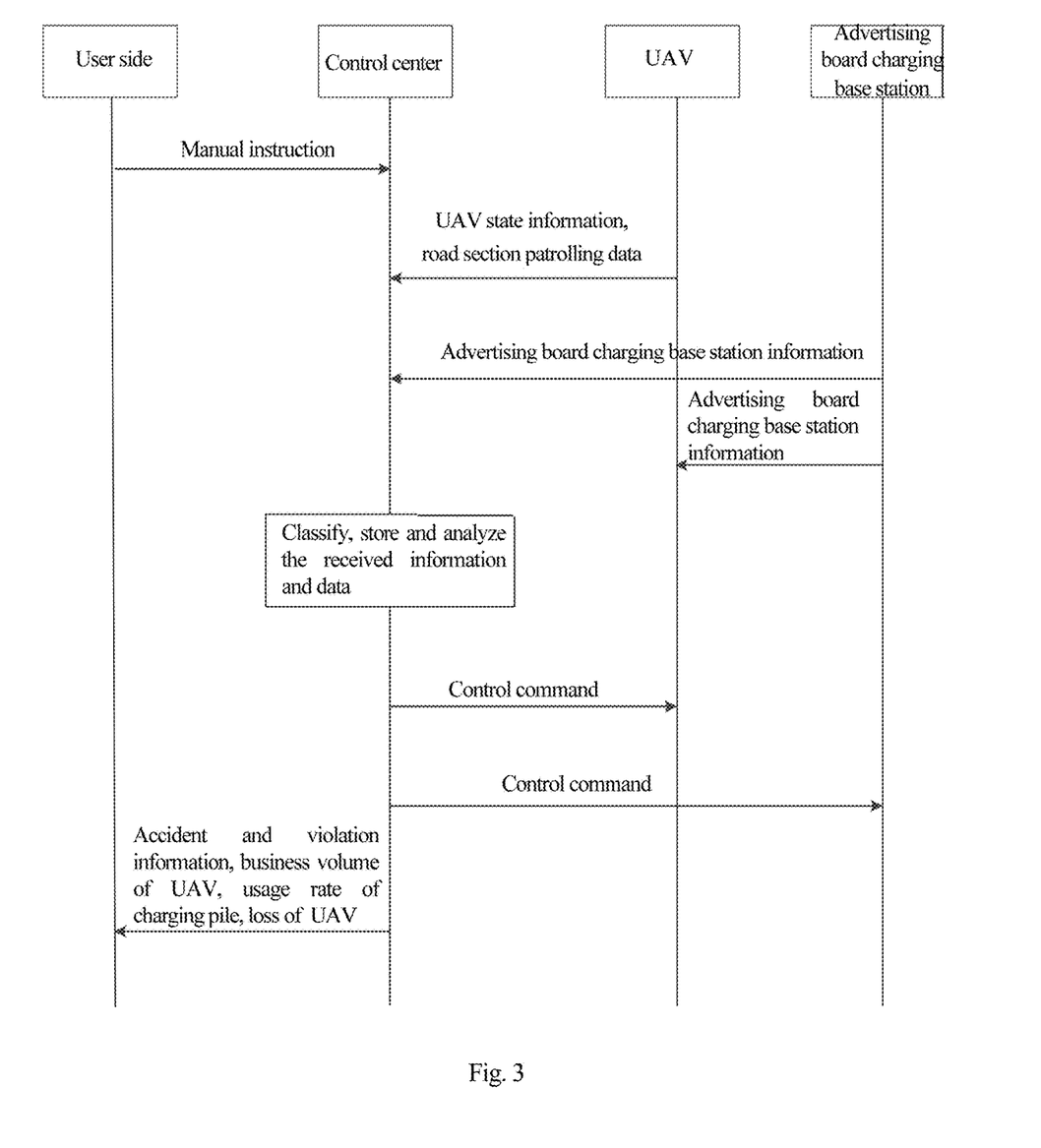
FIG. 3 is a schematic diagram of an interaction flow of a system for patrolling an expressway by UAVs provided by the embodiment of the present disclosure.

Specific interactions of the UAVs, the advertising board charging base stations and the control center may refer to FIG. 3. FIG. 3 is a schematic diagram of an interaction flow of a system for patrolling an expressway by UAVs provided by the embodiment of the present disclosure.

It can be understood that part of the content of the second aspect is completely the same as the first aspect in principle, so details are not described here again.

Figure 4:
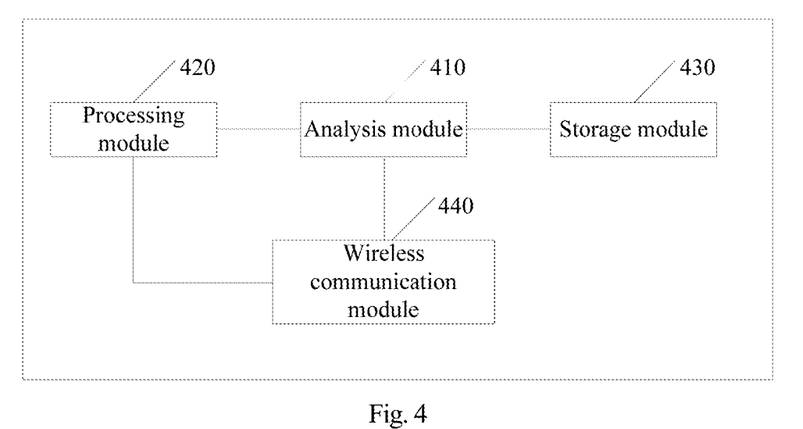
FIG. 4 is a structural schematic diagram of a control center provided by the embodiment of the present disclosure.

On the third aspect, the embodiment of the present disclosure provides a control center. FIG. 4 is a structural schematic diagram of a control center provided by the embodiment of the present disclosure. Referring to FIG. 4, the control center includes:

an analysis module 410, configured to receive UAV status information sent by a plurality of UAVs, classify the received UAV status information, and perform analysis respectively according to the categories of the UAV status information to obtain status results corresponding to the various UAVs; and a processing module 420, configured to generate and send corresponding control instructions to the various UAVs according to the status results corresponding to the various UAVs.

During specific implementation, the above control center also includes a wireless communication module 430. In some embodiments, the above analysis module may specifically receive the status information sent by the plurality of UAVs through the wireless communication module 430. The above processing module 420 may specifically send the corresponding control instructions to the various UAVs through the wireless communication module 430.

In addition, the above control center may also include a storage module 440. The storage module 440 may manage the UAV status information by a database technology and the like. The management includes storage, updating, backup, recovery, optimization and the like. During the management, different management modes may be set for different categories of UAV status information.

The aspect as described above and any possible implementation further provide an implementation, and the analysis module 410 is further configured to:

receive road section patrolling data sent by the plurality of UAVs, and analyze the road section patrolling data received in a preset period and recorded road section traffic data to obtain average business volumes corresponding to the various UAVs.

The aspect as described above and any possible implementation further provide an implementation, and the categories of the UAV status information include:

a to-take-off state category, which is a category of UAV status information indicating that an UAV is stopped on a designated advertising board charging base station and has a power exceeding a preset threshold value;

a patrolling state category, which is a category of UAV status information indicating that an UAV is executing a patrolling task and does not complete this task;

a to-land state category, which is a category of UAV status information indicating that an UAV has completed the patrolling task and does not land;

a charging state category, which is a category of UAV status information indicating that an UAV is stopped on a designated advertising board charging base station and has a powder not exceeding a preset threshold value; and a prewarning state category, which is a category of UAV status information indicating that an UAV is deviated from preset flight path points by an amount greater than a preset threshold value or the own power is not enough to allow the UAV to land on a designated advertising board charging base station.

The aspect as described above and any possible implementation further provide an implementation, and the analysis module 410 is also configured to: receive advertising board charging base station information sent by a plurality of advertising board charging base stations, and analyze the advertising board charging base station information received within a preset period to obtain usage rates of charging piles on the various advertising board charging base stations.

The aspect as described above and any possible implementation further provide an implementation, and in some embodiments, the processing module 420 is specifically configured to:

generate and send a patrol start instruction to the first UAV according to the state result corresponding to the first UAV, so as to cause the first UAV to start patrolling according to a preset flight path;

generate and send a continue-to-patrol instruction to the second UAV according to the state result corresponding to the second UAV, so as to cause the second UAV to continue the patrolling according to the preset flight path;

generate and send a patrol end instruction to the second UAV according to the state result corresponding to the third UAV, so as to cause the third UAV to land on a designated advertising board charging base station and start to be charged;

generate and send a continue-to-charge instruction to the fourth UAV according to the state result corresponding to the fourth UAV, so as to cause the fourth UAV to continue to keep the charging state; and generate and send an emergency landing instruction to the fifth UAV according to the state result corresponding to the fifth UAV, so as to cause the fifth UAV to land on an advertising board charging base station available for charging and closest to the current fifth UAV and start to be charged.

The UAV status information corresponding to the first UAV, the second UAV, the third UAV, the fourth UAV and the fifth UAV is respectively the to-take-off state category, the patrolling state category, the to-land state category, the charging state category and the prewarning state category.

The aspect as described above and any possible implementation further provide an implementation, and the UAV status information includes: UAV numbered information, UAV model information, UAV power information, UAV position information and task queue information.

Figure 5:
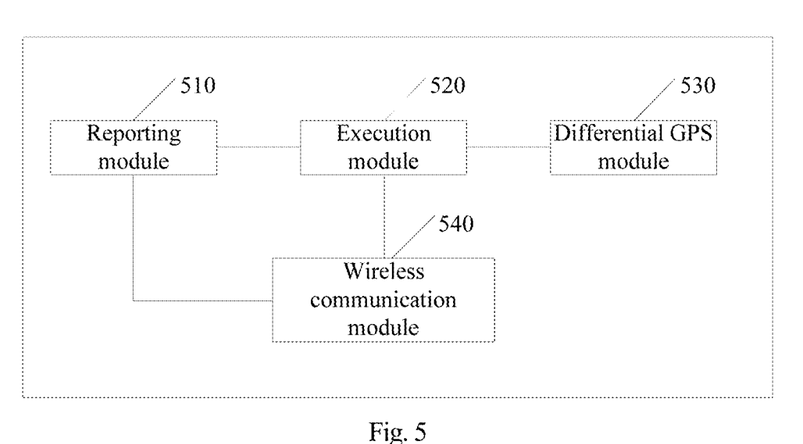
FIG. 5 is a structural schematic diagram of an UAV provided by the embodiment of the present disclosure.

On the fourth aspect, the embodiment of the present disclosure provides an UAV. FIG. 5 is a structural schematic diagram of an UAV provided by the embodiment of the present disclosure. Referring to FIG. 5, the UAV includes:

a reporting module 510, configured to send status information to a control center such that the control center classifies the received UAV status information and performs analysis respectively according to the categories of the UAV status information to obtain status results corresponding to the various UAVs;

an execution module 520, configured to receive control instructions generated and sent by the control center based on the status results, and execute task commands carried in the control instructions.

During specific implementation, the reporting module 510 is also configured to:

send road section patrolling data to the control center such that the control center analyze the road section patrolling data received within a preset period and recorded road section traffic data to obtain average business volumes corresponding to the various UAVs.

During specific implementation, categories of the UAV status information include:

a to-take-off state category, which is a category of UAV status information indicating that an UAV is stopped on a designated advertising board charging base station and has a power exceeding a preset threshold value;

a patrolling state category, which is a category of UAV status information indicating that an UAV is executing a patrolling task and does not complete this task;

a to-land state category, which is a category of UAV status information indicating that an UAV has completed the patrolling task and does not land;

a charging state category, which is a category of UAV status information indicating that an UAV is stopped on a designated advertising board charging base station and has a powder not exceeding a preset threshold value; and a prewarning state category, which is a category of UAV status information indicating that an UAV is deviated from preset flight path points by an amount greater than a preset threshold value or the own power is not enough to allow the UAV to land on a designated advertising board charging base station.

During specific implementation, in some embodiments, the execution module 520 is specifically configured to:

receive a patrol start instruction generated and sent by the control center based on a state result, and start patrolling according to a preset flight path; or receive a continue-to-patrol instruction generated and sent by the control center based on a state result, and continue the patrolling according to the preset flight path; or receive a patrol end instruction generated and sent by the control center based on a state result, and enable an UAV to land on a designated advertising board charging base station and start to be charged; or receive a continue-to-charge instruction generated and sent by the control center based on a state result, and continue to keep the charging state; or receive an emergency landing instruction generated and sent by the control center based on a state result, and enable an UAV to land on an advertising board charging base station available for charging and closest to the current UAV and start to be charged.

During specific implementation, the above UAV also includes a wireless communication module 530. In some embodiments, the above reporting module 510 may specifically send the status information and the road section patrolling data to the control center through the wireless communication module 530. The above execution module 520 may specifically receive the control instructions sent by the control center through the wireless communication module 530.

In addition, the UAV also includes a differential GPS (Global Positioning System) module 540. The differential GPS module 540 is configured to receive GPS data and correction information sent by a reference station, and correct a positioning result of the UAV, thereby improving the positioning precision and realizing precise landing and charging at the charging pile level.

During specific implementation, the UAV status information includes: UAV numbered information, UAV model information, UAV power information, UAV position information and task queue information.

During specific implementation, the above UAV also includes:

a charging guide slot, which is of an inverted funnel shape. The tail end of the charging guide slot is abutted with the outer edge of a charging jack of the UAV, and the charging guide slot is configured to guide the charging jack to be aligned with a charging pile when the UAV lands for charging.

To facilitate the cooperation among the charging guide slot, the charging jack and the charging pile, the charging pile is of a columnar structure.

It should be noted that the present disclosure does not limit whether the UAV uses wireless charging or wired charging.

Figure 6:
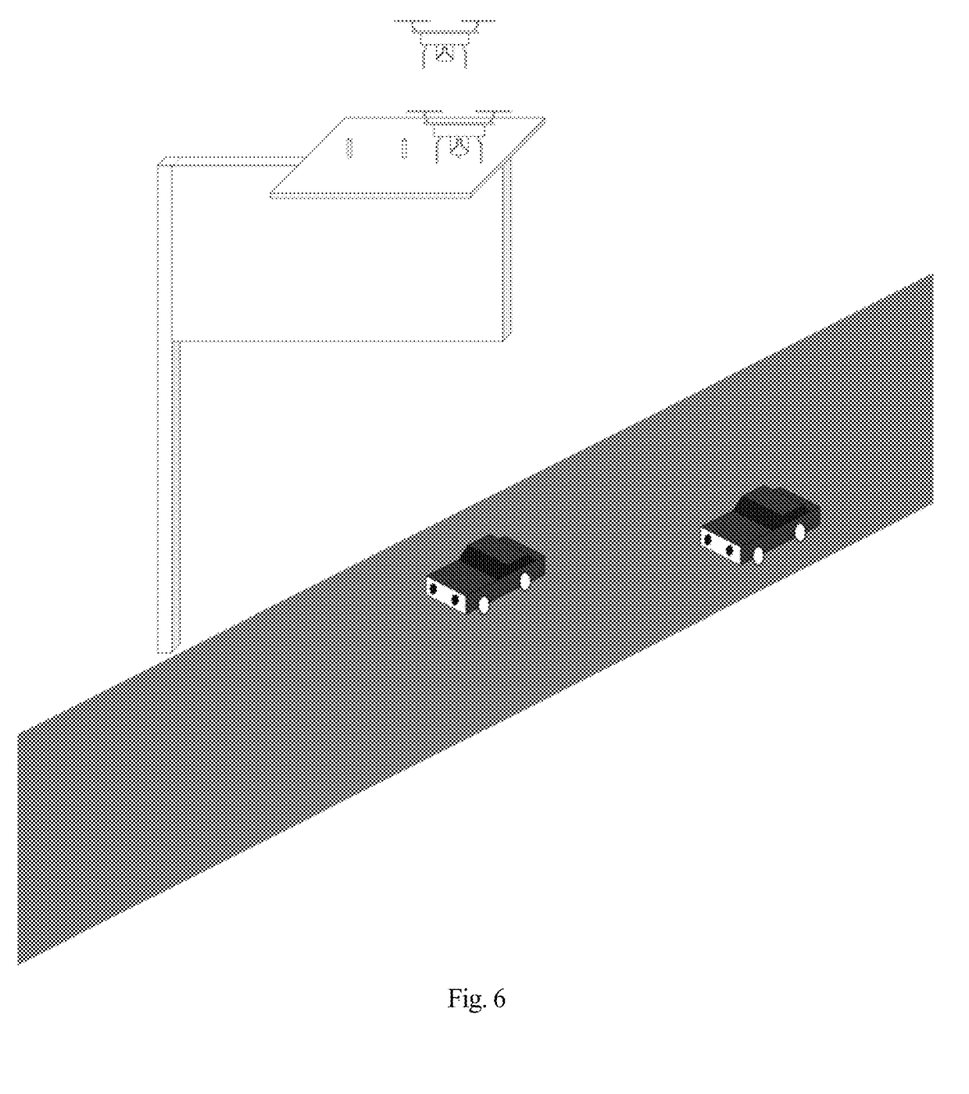
FIG. 6 is a structural schematic diagram of an advertising board charging base station provided by the embodiment of the present disclosure.

On the fifth aspect, the embodiment of the present disclosure provides an advertising board charging base station. FIG. 6 is a structural schematic diagram of an advertising board charging base station provided by the embodiment of the present disclosure. Referring to FIG. 6, the advertising board charging base station includes:

an advertising board body 610, distributed along the roadside of an expressway;

a charging platform 620, disposed on the advertising board body 610, wherein at least one UAV charging pile is arranged on the charging platform, and the charging pile is powered by a power supply carried by the advertising board body;

a communication unit 630, disposed on the advertising board body 610 and configured to establish a communication connection with an UAV and a control center to send advertising board charging base station information to the UAV and the control center.

In some embodiments, the shape of the charging pile may be of a columnar structure matched with a charging guide slot and a charging jack.

Advertising board charging base station information includes: charging pile idling information, charging model information and correction information.

In addition, the advertising board charging base station also includes a differential GPS (Global Positioning System) unit 640. The differential GPS module 640 is configured to generate the correction information corresponding to the corresponding UAV.

Figure 7:
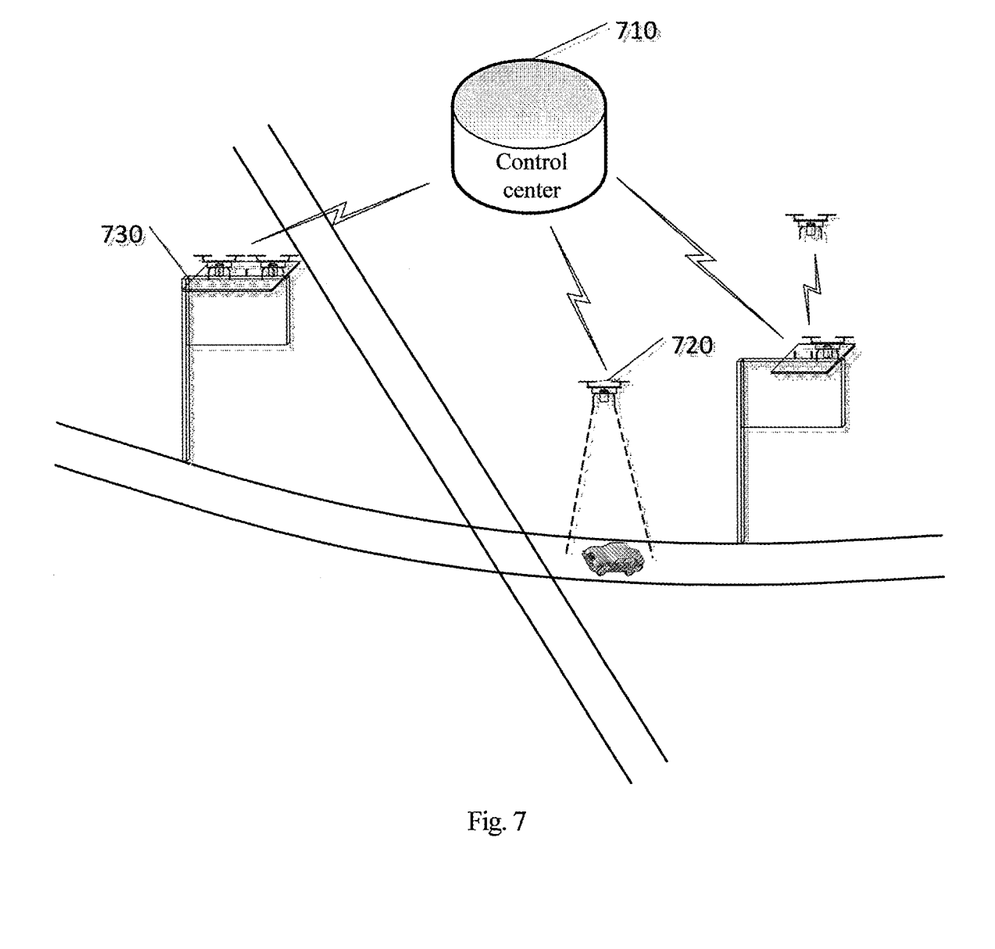
FIG. 7 is a structural schematic diagram of a system for patrolling an expressway by UAVs provided by the embodiment of the present disclosure.

On the sixth aspect, the embodiment of the present disclosure provides a system for patrolling an expressway by UAVs. FIG. 7 is a structural schematic diagram of a system for patrolling an expressway by UAVs provided by the embodiment of the present disclosure. Referring to FIG. 7, the system includes a control center 710, a plurality of UAVs 720 and a plurality of advertising board charging base stations 730. The control center 710, the UAVs 720 and the advertising board charging base stations 730 are directly connected through a wireless network. The control center 710 herein may be the control center of the third aspect. The UAVs 720 may be the UAV of the fourth aspect. The advertising board charging base stations 730 may be the advertising board charging base station of the fifth aspect.

A specific interaction of the UAVs, the advertising board charging base stations and the control center may refer to FIG. 3. FIG. 3 is a schematic diagram of an interaction flow of a system for patrolling an expressway by an unmanned aerial vehicle provided by the embodiment of the present disclosure.

The embodiments of the present disclosure provide a method and system for patrolling an expressway by UAVs. The method is applied to the system including the control center, the plurality of UAVs and the plurality of advertising board charging base stations. The method firstly receives the UAV status information sent by the plurality of UAVs and the road section patrolling data through the control center, and receives the advertising board charging base station information sent by the plurality of advertising board charging base stations, then classifies, stores and analyzes the received data and information, and finally generates and sends the control commands for the UAVs and charging advertising boards. On one hand, the technical solutions of the present disclosure may comprehensively schedule an UAV formation, may also comprehensively control the charging base stations, and may further dispose and schedule task responses; and on the other hand, the technical solutions of the present disclosure may analyze accident-prone road sections, traffic violation types and ratios and usage rates of the charging piles, thereby generating and providing corresponding suggestions to the user side.

Those skilled in the art can clearly understand that for the convenience and brevity of the descriptions, the specific working processes of the system, the devices and the units which are described above can refer to the corresponding processes in the foregoing method embodiment, and details are not described here again.

In several embodiments provided by the present disclosure, it should be understood that the disclosed system, devices and method may be implemented in other ways. For example, the device embodiment described above is merely illustrative. For example, the division of the units is only a logical function division, and there may be another division way during actual implementation. For example, multiple units or components may be combined or integrated into another system, or some features can be ignored or not executed. In addition, mutual coupling or direct coupling or communication connection shown or discussed may be via some interfaces, and indirect coupling or communication connection between devices or unit may be in electrical, mechanical or other forms.

The units described as separate components may or may not be physically separated, and the components displayed as units may or may not be physical units, that is, may be located in one place, or may be distributed to multiple network units. Part or all of the units may be selected according to actual needs to achieve the objectives of the solutions of the present embodiments.

In addition, the various functional units in the various embodiments of the present disclosure may be integrated in one processing unit, or each unit may exist physically alone, or two or more units may be integrated in one unit. The above integrated unit can be implemented in the form of hardware or in the form of a hardware and software functional unit. The above integrated unit implemented in the form of a software functional unit may be stored in a computer readable storage medium. The above software functional unit is stored in one storage medium, and includes a plurality of instructions configured to cause one computer device (which may be a personal computer, a server, or a network device, etc.) or a processor to perform part of the steps of the methods of the various embodiments of the present disclosure. The foregoing storage medium includes: various media capable of storing program codes, such as a USB flash disk, a mobile hard disk, a Read-Only Memory (ROM), a Random Access Memory (RAM), a magnetic disk or an optical disk.

The above is only the preferred embodiments of the present disclosure, and is not intended to limit the present disclosure. Any modifications, equivalent replacements, improvements and the like that are made within the spirit and principle of the present disclosure shall all fall within the protection scope of the present disclosure.

The invention claimed is:

1. A system for patrolling an expressway by unmanned aerial vehicles (UAVs), comprising a control center, a plurality of UAVs and a plurality of advertising board charging base stations;

wherein the control center comprises:
an analysis module, configured to receive UAV status information sent by a plurality of UAVs, classify the received UAV status information, and perform analysis respectively according to categories of the UAV status information to obtain status results corresponding to the plurality of UAVs; and a processing module, configured to generate and send corresponding control instructions to the plurality of UAVs according to the status results corresponding to the plurality of UAVs;

wherein, each of the plurality of UAVs comprises:
a reporting module, configured to send status information to the control center such that the control center classifies the received UAV status information and performs analysis respectively according to the categories of the UAV status information to obtain status results corresponding to the various UAVs; and
an execution module, configured to receive control instructions generated and sent by the control center based on the status results, and execute task commands carried in the control instructions;

wherein, each of the advertising board charging base stations comprises:
an advertising board body, distributed along the roadside of an expressway;
a charging platform, disposed on the advertising board body, wherein at least one UAV charging pile is arranged on the charging platform, and the charging pile is powered by a power supply carried by the advertising board body;
a communication unit, disposed on the advertising board body and configured to establish a communication connection with the UAV and the control center to send advertising board charging base station information to each of the UAVs and the control center, wherein the categories of the UAV status information comprise:
a to-take-off state category, which is a category of UAV status information indicating that an UAV is stopped on a designated advertising board charging base station and has a power exceeding a preset threshold value;
a patrolling state category, which is a category of UAV status information indicating that an UAV is executing patrolling task and does not complete this task,
a to-land state category, which is a category of UAV status information indicating that an UAV has completed the patrolling task and does not land,
a charging state category, which is a category of UAV status information indicating that an UAV is stopped on a designated advertising board charging base station and has a power not exceeding a preset threshold value; and
a pre-warning state category, which is a category of UAV status information indicating that an UAV is deviated from preset flight path points by an amount greater than a preset threshold value or the own power is not enough to allow the UAV to land on a designated advertising board charging base station.

2. The system according to claim 1, wherein the analysis module is also configured to:
receive road section patrolling data sent by the plurality of UAVs, and analyze the road section patrolling data received within a preset period and recorded road section traffic data to obtain average business volumes corresponding to the various UAVs; and/or
receive advertising board charging base station information sent by a plurality of advertising board charging base stations, and analyze the advertising board charging base station information received within a preset period to obtain usage rates of charging piles on the various advertising board charging base stations.

3. The system according to claim 1, wherein the reporting module is also configured to:
send the road section patrolling data to the control center such that the control center analyzes the road section patrolling data received within a preset period and recorded road section traffic data to obtain the average business volumes corresponding to the various UAVs.

4. The system according to claim 1, further comprising:
a differential GPS (Global Positioning System) module, configured to receive GPS data and correction information sent by the corresponding advertising board charging base stations, and correct positioning results of the UAVs; and/or
a charging guide slot, which is of an inverted funnel shape, wherein the tail end of the charging guide slot is abutted with the outer edge of a charging jack of the UAV, and the charging guide slot is configured to guide the charging jack to be aligned with a charging pile when the UAV lands for charging.

5. The system according to claim 1, wherein the advertising board charging base station information comprises: charging pile idling information, charging model information and correction information;
wherein, the advertising board charging base station also comprises: a differential GPS unit, configured to generate the correction information corresponding to the UAV.

6. The system according to claim 1, wherein the plurality of UAVs include at least a first UAV, a second UAV, a third UAV, a fourth UAV and wherein the processing module is configured to:
generate and send a patrol start instruction to the first UAV according to the state result corresponding to the first UAV, so as to cause the first UAV to start patrolling according to a preset flight path;
generate and send a continue-to-patrol instruction to the second UAV according to the state result corresponding to the second UAV, so as to cause the second UAV to continue the patrolling according to the preset flight path;
generate and send a patrol end instruction to the third UAV according to the state result corresponding to the third UAV, so as to cause the third UAV to land on a designated advertising board charging base station and start to be charged;
generate and send a continue-to-charge instruction to the fourth UAV according to the state result corresponding to the fourth UAV, so as to cause the fourth UAV to continue to keep the charging state; and
generate and send an emergency landing instruction to the fifth UAV according to the state result corresponding to the fifth UAV, so as to cause the fifth UAV to land on an advertising board charging base station available for charging and closest to the current fifth UAV and start to be charged;
wherein the UAV status information corresponding to the first UAV, the second UAV, the third UAV, the fourth UAV and the fifth UAV is respectively the to-take-off state category, the patrolling state category, the to-land state category, the charging state category and the pre-warning state category.

7. The system according to claim 1, wherein the UAV status information includes: UAV numbered information, UAV model information, UAV power information, UAV position information and task queue information.

8. The system according to claim 1, wherein the execution module is configured to:
- receive a patrol start instruction generated and sent by the control center based on a state result, and start patrolling according to a preset flight path; or
- receive a continue-to-patrol instruction generated and sent by the control center based on a state result, and continue the patrolling according to the preset flight path; or
- receive a patrol end instruction generated and sent by the control center based on a state result, and enable an UAV to land on a designated advertising board charging base station and start to be charged; or
- receive a continue-to-charge instruction generated and sent by the control center based on a state result, and continue to keep the charging state; or
- receive an emergency landing instruction generated and sent by the control center based on a state result, and enable an UAV to land on an advertising board charging base station available for charging and closest to the current UAV and start to be charged.

* * * * *